(12) United States Patent
Smith et al.

(10) Patent No.: US 7,281,891 B2
(45) Date of Patent: Oct. 16, 2007

(54) WIND TURBINE CONTROL HAVING A LIDAR WIND SPEED MEASUREMENT APPARATUS

(75) Inventors: David A Smith, Malvern (GB); Michael Harris, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 10/546,605

(22) PCT Filed: Feb. 26, 2004

(86) PCT No.: PCT/GB2004/000841

§ 371 (c)(1),
(2), (4) Date: Aug. 23, 2005

(87) PCT Pub. No.: WO2004/077068

PCT Pub. Date: Sep. 10, 2004

(65) Prior Publication Data

US 2006/0140764 A1    Jun. 29, 2006

(30) Foreign Application Priority Data

Feb. 28, 2003    (GB)    ................................. 0304603.4

(51) Int. Cl.
*F03D 7/04*    (2006.01)
(52) U.S. Cl. .................. 415/4.3; 415/118; 416/41; 416/61; 416/117; 290/55
(58) Field of Classification Search ................. 415/2.1, 415/4.1, 4.3, 4.5, 47, 48, 147, 905, 908; 416/1, 416/41, 61, 117; 73/170.01, 170.11
See application file for complete search history.

(56) References Cited

U.S. PATENT DOCUMENTS 4,651,017 A    3/1987    Longrigg
6,320,272 B1*    11/2001    Lading et al. ................. 290/55

FOREIGN PATENT DOCUMENTS

WO    98/42980    10/1998

OTHER PUBLICATIONS

International Search Report for PCT/GB2004/000841 dated Jun. 21, 2004.

(Continued)

*Primary Examiner*—Richard A. Edgar
(74) *Attorney, Agent, or Firm*—Nixon & Vanderhye P.C.

(57) ABSTRACT

A wind turbine is provided having a lidar wind speed measurement apparatus for achieving wind control. The lidar apparatus is arranged to scan the area in front of the wind turbine so as to generate a measurement of the wind speed across the wind field. The lidar apparatus may be located in the hub of the wind turbine and the look direction inclined away from the rotational axis so that rotation of the hub ensures scanning. Preferably the lidar apparatus has a plurality of look directions so as to increase the scanning rate. This may be achieved by having a number of dedicated lidar systems and/or by using multiplexed lidars. Measurement of the wind field allows improved control of the wind turbine giving efficiency and reduced wear benefits.

23 Claims, 3 Drawing Sheets

OTHER PUBLICATIONS

Figure 1:
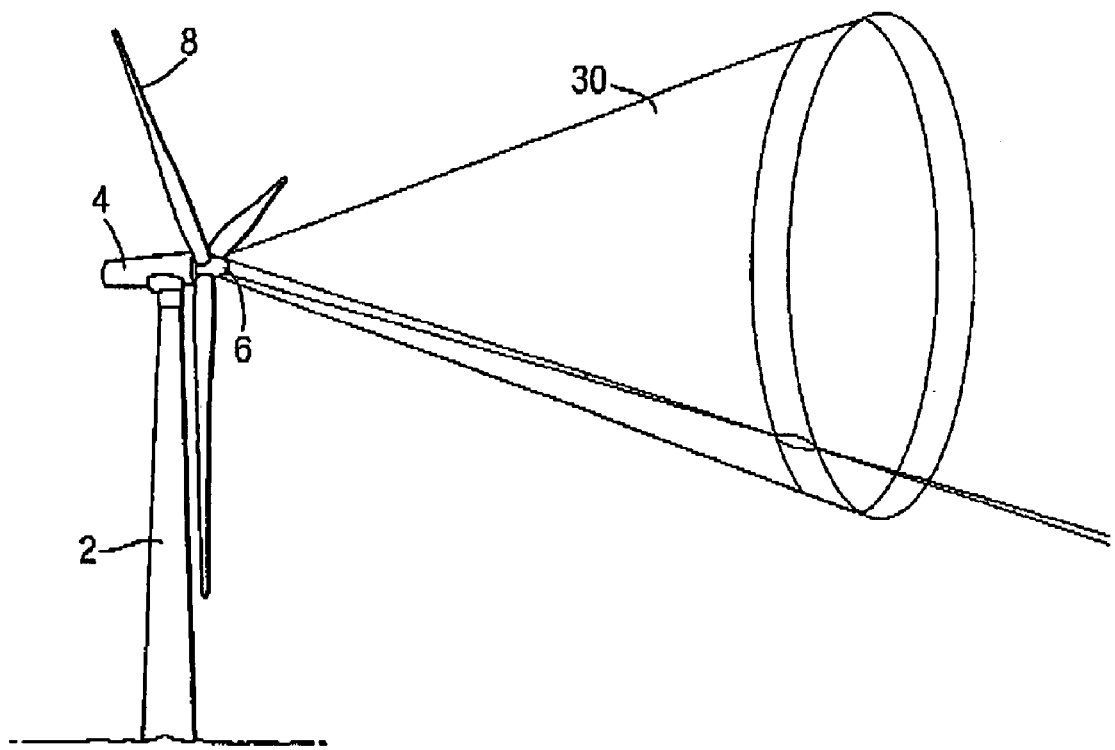

UK Search Report for GB 0304603.4 dated Sep. 3, 2003.
Vaughan et al., *Laser Doppler Velocimetry Applied to the Measurement of Local and Global Wind*, 1989, vol. 13, No. 1, pp. 1-15, XP-002057358.

Lockey et al., *Multicomponent time-division-multiplexed optical fibre laser Doppler anemometry*, Optoelectronics, Institute of Electrical Engineers, vol. 144, No. 3, Jun. 20, 1997, pp. 168-175, XP-006008847.

* cited by examiner

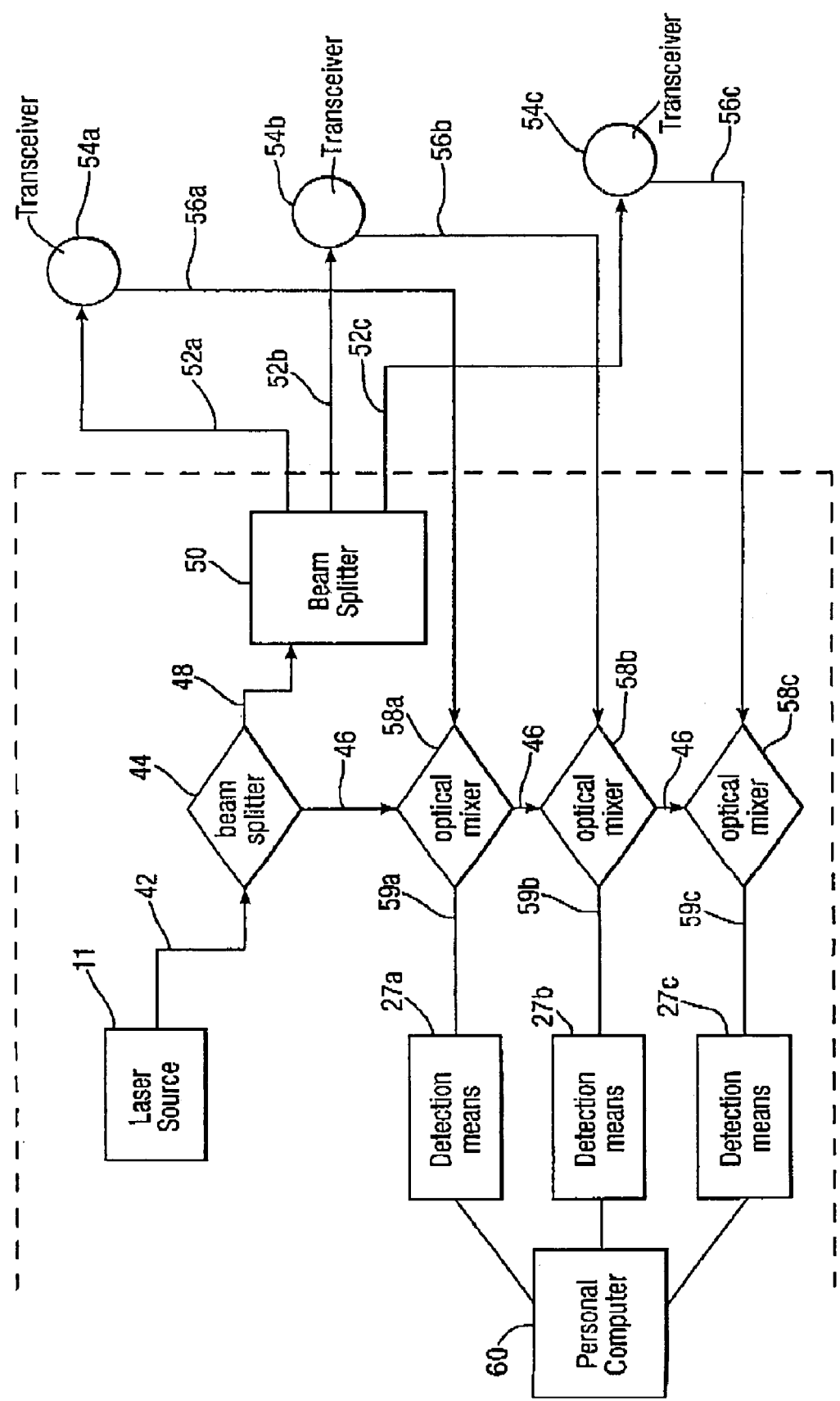

WIND TURBINE CONTROL HAVING A LIDAR WIND SPEED MEASUREMENT APPARATUS

This application is the U.S. national phase of international application PCT/GB2004/000841 filed 26 Feb. 2004 which designated the U.S. and claims benefit of GB 0304603.4 filed 28 Feb. 2003, the entire contents of each of which are hereby incorporated by reference.

This invention relates to a control system for a wind turbine and to wind turbines having lidar systems to provide pitch blade control.

Wind turbines are growing in popularity as a means of generating energy due to their renewable nature and lack of pollution. The wind turbines generally have a rotor with two or three blades connected to a generator.

The efficiency with which a wind turbine can extract power from the wind will depend on various factors. It is known that maintaining a constant tip speed to wind speed ratio can improve the performance of some wind turbines. This however requires knowledge of the wind speed. U.S. Pat. No. 4,331,881 discloses a field control system for wind driven generators in which the wind speed is determined by an anemometer, such as a cup anemometer, and the field current of the generator controlled so as to load the turbine to maintain a constant tip speed to wind speed ratio.

Cup anemometers and the like however suffer from the disadvantage that when mounted on the turbine they only give an indication of the wind speed at the turbine. Altering the turbine characteristics can take a finite amount of time and therefore ideally the wind speed a short distance in front the turbine is required so that the correct setting can be implemented. It is known to place anemometers on masts ahead of the wind turbine but, given that the turbine rotates to face the wind, the mast may not always be correctly positioned in front of the turbine.

Laser radar (Lidar) systems have been known for measuring wind speed and direction for many years. Typically, they have employed $CO_2$ laser systems and have been successfully employed on a wide range of applications. Typically, the lidar operates by scattering radiation from natural aerosols (dust, pollen, water droplets etc.) and by measuring the Doppler shift between the outgoing and returning radiation. In order to measure wind speed and direction it is usual to scan the lidar, typically using a conical scan, so that the wind vector may be intersected at a range of angles, enabling the true (3D) velocity vector to be deduced. Other scanning patterns could be used to determine the true vector, provided the lidar pointing direction is always known with a high degree of accuracy. Such lidars have been used to measure wind shear, turbulence and wake vortices for many years in both military and civil applications.

Laser Doppler Velocimetry Applied to the Measurement of Local and Global Wind, J. M Vaughan and P. A. Forrester, Wind Engineering, Vol. 13 No. 1 1989 describes how a lidar system can be used to take wind measurements ahead of a wind turbine to allow control of blade pitch for most efficient operation.

WO98/42980 teaches that a laser anemometer can be mounted on a wind turbine so as to follow motion of the nacelle. In other words the lidar system can be arranged, for instance by mounting on the nacelle, to always look at the same position relative to the nacelle. In this way the lidar system always gives an indication of the wind speed a certain distance upwind. This allows a controller to set an appropriate blade pitch for the detected wind speed to maintain a constant tip speed to wind speed ratio.

The wind speed data collected by the apparatus described in WO98/42980 is limited however and only basic control of the wind turbine is permitted.

It is therefore an object of the invention to provide an improved wind turbine control system.

Thus according to the present invention there is provided a wind turbine having a lidar means for determining wind speed wherein the lidar means is mounted in the hub of the turbine and has at least one look direction inclined to the axis of rotation thereof such that as the hub rotates the lidar means scans the area in front of the turbine.

The wind speed in front of a turbine is unlikely to be a uniform wind speed field and variations in the wind speed across the area swept out by the blades can affect the way that the turbine operates. By scanning the lidar means across the area in front of the turbine, i.e. the area in front of the direction that the nacelle is currently pointing, the wind velocity field can be determined which can aid control of the wind turbine. Some examples of improved control schemes will be described later.

Mounting the lidar means in the hub allows the rotation of the hub, as it is driven by the wind, to provide the motive scanning means. This not only removes the need for complex scanning mechanisms but hub mounting also means that the lidar means is not obstructed at any point by the blades of the wind turbine, unlike nacelle mounted systems.

A lidar means with only one look direction inclined off axis will take the time taken for one revolution of the hub to complete a scan. With large wind turbines the revolution rate can be relatively slow. In order to ensure that wind speed data is acquired from all directions with sufficient frequency the lidar means may have a plurality of look directions. For instance three lidar look directions, all at the same angle or otherwise arranged to scan the same area, could be provided equally spaced around the hub. One revolution of the hub would then result in the same area in front of the turbine being scanned three times. More than three look directions could be provided as required, for instance four or six directions.

Additionally or alternatively at least two look directions could be arranged so as to scan different areas when the hub is rotated. For instance two look directions inclined at different angles to the hub would scan different areas when the hub is rotated. In this way more detailed information about the wind field in front of the turbine may be built up. For instance three look directions could be provided at one angle to the axis of rotation and another three look directions provided at a lower angle, each group of three look directions being spaced equidistantly around the hub. This would result in two conical scan patterns being traced. A scan corresponding to the outer cone would be traced by the three look directions at the higher angle and an inner cone traced by the three look directions at the lower angle. Both cones would be swept three times every revolution. One look direction could also be arranged to lie along, or be parallel to, the axis of rotation.

The lidar means could comprise a number of separate lidars having single look direction. Each lidar would have its own laser, transmit and receive optics and detector. This is a simple means of achieving multiple look directions without loss of transmit power. However the cost of having several look directions can be reduced by utilising multiplexed lidar apparatus to provide at least some of the look directions. The multiplexed lidar apparatus has one laser source but two or more sets of transmit/receive optics to allow beams to be sent in different look directions. The multiplexed lidar apparatus may be of the switched kind, where a single beam is cyclically switched into different transmit/receive optics, or of the beam splitting kind where the laser beam is split into different transmit beams. The switched kind of multiplexed lidar would need to be operated at three times the frequency of three separate single beam lidars to provide the same level of data. The beam splitting type can operate at the same frequency but does require a separate detector for each channel and obviously output beam power is reduced.

If required the lidar means could be provided with a scanning means. The scanning means could scan, in use, at least one look direction relative to the hub. A relatively simple scanning means, such as a rotating prism or mirror could be used which, together with the hub rotation, could give complex scan patterns. However a scanning means would generally require a moving optical system located within the hub which adds complexity.

Preferably at least one look direction is inclined in the range of 5°-20° of the axis of rotation and more preferably within the range of 10°-20° of the axis of rotation. An off axis angle in this range, say inclined substantially 15° to the axis of rotation, gives a good scan of the wind field in front of the turbine. This allows the wind speed at a sufficiently wide field of view to be determined. Wind changes may not necessarily come from directly in front of the wind turbine and monitoring the wind field across a wide field of view can detect wind changes coming from off axis.

The wind field measurement from the lidar means is preferably input to a control means to control the wind turbine. One useful control is to control the pitch of the rotor blades.

One use for the present invention is in gust control. Sudden changes in wind speed at the turbine can exert undue loading on one or more blades and lead to increased stress. This in turn can cause fatigue, which results in a shorter lifetime or more frequent servicing for the turbine. Using a lidar, gusts can be detected well before the wind change reaches the turbine tower. Given enough notice (typically a few seconds) the blades could be feathered (using the pitch control common on larger turbines) thereby reducing the excess loading which a gust would cause. In this way wear could be reduced and operational life extended. In extreme cases such a mechanism could prevent damage from occurring.

Gusts, by their very nature, may not come from directly in front of the turbine. The gust detection system described herein therefore enables off-axis wind changes to be detected as well.

In a preferred embodiment the control means is adapted to independently alter the pitch of each blade as it rotates. Because wind speed normally increases with height it is quite usual for the wind pressure on the uppermost blade to be much higher than that on the lower blades. This can lead to an imbalance in the load on the transmission train. However, variations in wind speed over the disc could be balanced out by dynamically varying the individual blades during each rotation, i.e. load balancing. This would improve the balance on the drive train, reduce wear and improve lifetime. Ideally, one lidar beam per blade would measure wind speed in front of the rotor at a point immediately in front of the position a given blade will reach by the time the wind reaches that position.

Under different control regimes it might be possible to extract more energy from a varying wind by dynamically feathering the blades to the optimum angle. This type of control could, for instance, be used in conjunction with load balancing. When winds are relatively weak (and loads small) it may be preferential to vary the pitch of each blade as it sweeps around so as to extract the maximum amount of energy from the wind. Of course, this would be contrary to the principles of load balancing but at moderate wind speeds this may not be so important. However, as the wind speed increases, especially above that required for maximum output power, then the control regime could switch to load balancing instead. In this way the same lidar sensor could be used to maximise energy production in most conditions whilst affording greater protection in high and extreme winds.

Whilst the preferred embodiment of the invention uses a hub mounted lidar means it would be possible to mount the lidar means elsewhere. For instance a lidar system could be mounted on the nacelle and the look direction directed towards a mirror located in the hub on the axis of rotation. Rotation of the hub would then scan the mirror and provide off axis scanning. This could be achieved by directing a lidar beam through a hollow main axle. Some turbines do have offset gearboxes and do have hollow main axles. Alternatively a scanning optical system could be mounted in the nacelle. Multiple lidar look directions may be employed around the nacelle and scanned in different directions to scan the wind field in front of the nacelle. Therefore according to a second aspect of the invention there is provided a wind turbine having a lidar means arranged to scan the area in front of the turbine in a plurality of look directions. Preferably the lidar means is a multiplexed lidar apparatus, i.e. a lidar apparatus having a single laser coupled to two or more sets of transmit/receive optics.

The present invention therefore looks upwind and scans the wind field ahead of the wind turbine so as to allow control thereof. There is also benefit however in mounting a lidar system looking downwind of the wind turbine, i.e. looking backwards. By mounting a rearward facing lidar information about the wind field after it has passed the turbine, i.e. the turbine wake, can be collected. This information would include information about the turbulence caused by the wind turbine. Knowledge of the flow in the wake of the turbine can aid modelling of the turbine performance which could be used in a control system for optimising performance. Preferably the rearward looking lidar may be a scanning lidar to scan the region of interest.

A further refinement would be to use the scanning lidar means to quantify the energy input to the wind turbine. This could provide a more accurate wind field measurement than current mast-mounted anemometer techniques and it would be independent of turbine azimuth orientation. Also, it would provide a more exact measure of input wind energy than a single staring beam as described in WO98/42980. Such information could be used to provide an accurate determination of turbine Power Curve —an important measure of turbine performance. The Power Curve could be continuously monitored by an embedded lidar system designed for load balancing or gust protection as described above. Alternatively, the Power Curve could be measured using a separate lidar means designed to be temporarily mounted on a turbine specifically for this purpose and then moved from turbine to turbine making measurements as required.

Figure 2:
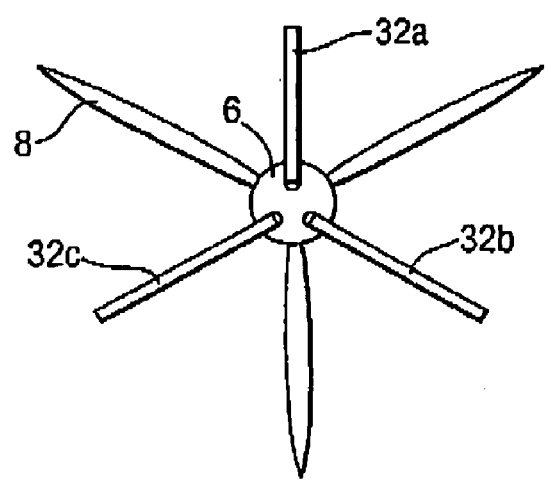
Figure 3:
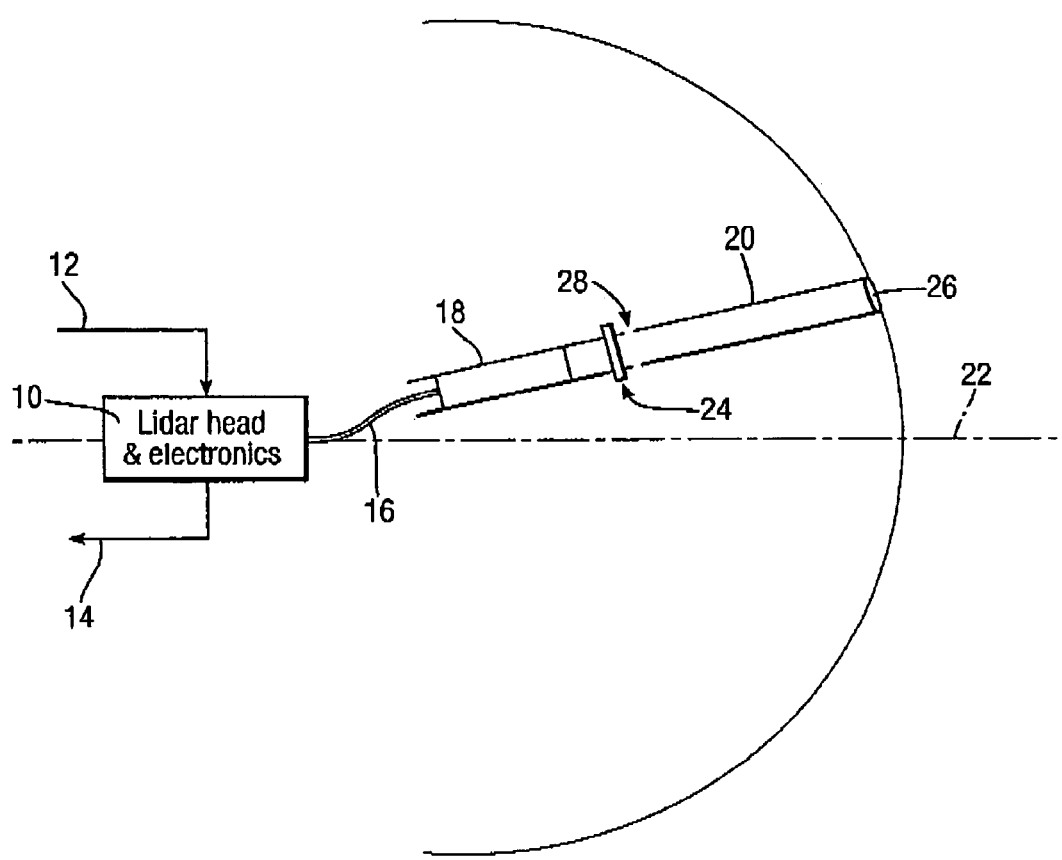

The invention will now be described by way of example only with respect to the following drawings of which;

FIG. 1 shows a schematic of a lidar mounted off axis in the hub of a wind turbine, FIG. 2 shows the front view of the hub and blades of a wind turbine provided with three lidar look directions, FIG. 3 shows a schematic of a lidar apparatus mounted in the hub of a wind turbine, and FIG. 4 shows schematic of a multiplexed lidar apparatus having a plurality of look directions.

FIG. 1 illustrates a wind turbine having a lidar system mounted in the hub and having a look direction inclined to the axis of rotation thereof. The turbine consists of a tower 2 bearing a nacelle 4. The nacelle 4 is connected to a rotating hub 6 which bears the blades 8. Three blades are common in modern wind turbines.

The nacelle 4 is at least partly rotatable in a plane orthogonal to the tower 2 so that the turbine always faces into the wind for maximum power extraction. The pitch of the blades 8 is controllable by an actuator located in the hub so as to vary the force experienced by the blades. Typically the pitch of the blades is varied to maximise efficient power extraction but in strong winds the blades may be feathered to protect the turbine.

WO98/42980 describes how a laser anemometer may be mounted on the nacelle 4 so as to determine the wind speed a certain distance in front of the turbine which gives advance warning of the wind conditions and allows for appropriate action to be taken.

The wind field in front of a turbine is not usually uniform however. This can lead to different conditions applying across the disc swept out by the blades 8, especially with the large turbines currently being built. For instance it is usual that the wind speed increases as one progresses upwards from the ground. Therefore the load of the blade(s) at the top of the turbine can be greater than that on the lower blade or blades. This can create a load imbalance. In strong winds this load imbalance can be significant and can lead to excessive wear on the turbine transmission. In less strong winds the load imbalance may not be great but the pitch determined for the wind speed at the middle of the disc swept by the blades may not be the most efficient.

Also gusts may not come from directly in front of the turbine and therefore gusts from off axis can arrive at the turbine and cause damage.

In one embodiment of the present invention therefore a lidar is located in the hub 6 and inclined with its look direction off axis. This is shown in more detail in FIG. 3.

The lidar head and electronics 10, i.e. laser source and detector, are located in a sealed unit on the axis of rotation to minimise vibration. Connections, 12 and 14 respectively, to a power source and control unit in the nacelle (not shown) are via slip rings between the hub and the nacelle. Alternatively the output from the lidar could be communicated by a fibre optic link or by wireless communication. The control unit may be located in the hub with the lidar unit, although it may still be wished to communicate the wind speed data outside, for instance to a central control unit for monitoring purposes.

A fibre optic 16 links the lidar head to transmit and receive optics—telescope 18. Telescope 18 is located in a tube 20 and positioned at an angle to the hub axis 22. The tube reduces the amount of dirt and precipitation that reaches the front optical window 24 through the opening 26 in the hub. Drain holes 28 in the tube 20 keep the tube dry. In practice this might not be sufficient and to maintain a clean front surface to the optic it might be better to blow clean dry air out through the tube. A simple passive compressor using the incident wind passed through a filter and dryer would probably suffice. Otherwise an active, fan could be employed. It may also be prudent, particularly in coastal regions where salt deposits occur, to incorporate a simple wash-wipe capability such as are frequently used to clean the headlamps of many motor cars.

Rotation of the hub due to the wind will therefore scan the lidar around the area in front of the turbine. Referring back to FIG. 1 it can be seen that a conical scan pattern 30 is achieved by a single lidar inclined at an angle to the axis.

The choice of offset angle (to the hub axis) will depend on the extent to which wind gusts are expected to arrive at non-normal angles. It will also depend on the choice of sampling position in front of the turbine blades. These parameters will vary from one turbine design to another and may also vary with the exact site of the turbine. A simple focus mechanism in the telescope will allow the lidar probe position to be easily adjusted, either during installation or dynamically during turbine operation. An angle of approximately ±15° to the axis would provide good coverage.

The skilled person would understand that any lidar system capable of determining wind speed could be used. However a particularly useful lidar system is described in WO01/35117, the contents of which is incorporated herein by reference thereto, especially the embodiment described on page 5, line 25 to page 7, line 16.

With large wind turbines the rate of revolution of the hub can reach rates as low as 10 revolutions per minute and larger turbines may have even slower rotation rates. Therefore a single lidar with a single look direction would take approximately 6 seconds to complete a scan. This may well be too slow to provide useful wind field data for control of the turbine.

In another embodiment of the present invention therefore it is proposed to provide a lidar system with multiple look directions. FIG. 2 illustrates a front view of a hub provided with three lidar look directions. In this example the three look directions are all arranged so that the area scanned by each look direction is the same and the look directions are spaced equidistantly. Referring back to FIG. 1 such an arrangement would scan the conical scan area three times each revolution or, in other words, each part of the scan would be repeated every 2 seconds, which should give sufficient information.

Of course more look directions could be used if desired, six look directions repeating the same scan would-provide an update every second. The look directions could also be arranged to scan different parts of the wind field to provide more complete information. One look direction could even be arranged on, or parallel to, the hub axis.

Achieving a number of look directions could easily be achieved by providing a number of lidars as described above each having a telescope arrangement as described with reference to FIG. 3 pointing in a different direction.

However in some circumstances it may be desired to use a multiplexed lidar apparatus. A multiplexed lidar apparatus is one having a single laser source connected to two or more sets of transmit/receive optics. For instance the lidar head 10 in FIG. 3 could be linked to three, say, differently arranged telescopes.

FIG. 4 shows a schematic of a suitable multiplexed lidar apparatus.

A laser source 11 emits a laser beam that is coupled into an optical fibre cable 42. A beam splitter 44 is provided and directs a small fraction of the laser power as a local oscillator signal to optical fibre cable 46, and the remaining optical power is directed in to optical fibre cable 48. A person skilled in the art would recognise that the optical power of the local oscillator signal would advantageously be adjusted to give optimised shot noise domination in the detector.

A three way beam splitter 50 equally divides the laser power incident from optical fibre cable 48 between the optical fibre cables 52a, 52b and 52c, which in turn are coupled to transceivers 54a, 54b and 54c. Each of the transceivers 54 transmit the laser radiation, and also output any received radiation (i.e. radiation reflected back to it from an object) to their respective optical fibre cables 56.

Optical mixers 58 coherently mix the received radiation of each of the optical fibre cables 56 with the local oscillator signal provided by the beam splitter 44. The resultant coherently mixed signals are output along optical fibre cables 59 to each of the respective detection means 27. A personal computer (or dedicated processor) 60 processes the data provided by each of the detection means 27 generating range or speed data as required. The device thus provides three simultaneous measurements of range and/or speed for the three transceivers; however this is at the cost of each transceiver requiring its own detection means 27.

Alternatively instead of the beamsplitter 50 an optical switch could be provided to receive radiation from optical fibre cable 48, and direct that radiation to any one of the transceivers 54a, 54b and 54c via the respective optical fibre cables 52a, 52b or 52c. Each transceiver 54 also couples any radiation received (i.e. any returned radiation) back into the relevant optical fibre cables 52, and the optical switch would then directs this radiation from the selected optical fibre cable 52 to a fibre optical cable for mixing with the LO signal and transmission to a single detector. Range and speed information, as required, can then be calculated by the personal computer 60 for the particular selected transceiver.

The optical switch would thus has the effect of routing optical power to one transceiver, and routing the return signal received by that transceiver to the detection means 27 thereby providing range or speed information. By switching the optical switch, the transceivers can be sequentially activated, allowing quasi-simultaneous measurements to be performed.

The optical switch could be any device that is capable of routing optical signals without any significant loss of the coherence information. Such switches are commonly used in the field of telecommunications.

The result of the wind field measurement could then be used to provide improved control of the wind turbine. As mentioned, gusts from off axis can be detected and the blades of the turbine feathered to prevent damage.

Measurement of the different wind speeds across the disc swept by the blades would however allow the pitch of each individual blade to be altered as it rotates. As mentioned, larger turbines have slower rotational rates and it is possible to adjust the pitch of the blade as it turns.

The pitch of the blades could then be moved to control the load across the blades and achieve load balancing. This would be useful in strong Winds as mentioned to prevent excessive wear of the transmission. In less strong winds, when load balancing is not an issue and maximum efficiency is required the pitch of each blade could be altered to ensure it is performing at maximum efficiency throughout the whole revolution.

It is also important to determine whether gust fronts maintain their coherence over the few hundred metres in front of the wind turbine. The lidar of the present invention allows identification of the gust front at some distance followed by scanning closer to the turbine to await its arrival. The propagation of gusts can be monitored by correlating the wind speeds at the different ranges. The range gate settings can be varied to examine correlation over different distances and to measure the delay in arrival time allowing appropriate control of the turbine. The data collected by the turbine can also be downloaded for longer term analysis leading to improvements in turbine design.

The airflow behind the rotor plane is also of interest to turbine manufacturers and wind farm site developers. A detailed characteristic of this flow in the wake would assist modelling of turbine performance and could be used in a control system to control turbine settings for optimal operation. Further, in siting individual turbines within a wind farm the so called shadowing effect of a wind turbine must be appreciated, i.e. the effect on wind flow a turbine has that may affect other turbines located downwind. Indeed in existing wind farms measurement of the wake from a turbine could be used in controlling that turbine or other turbines so as to maximise the efficiency of the wind farm as a whole. Thus a lidar system may be mounted on the wind turbine so as to measure the airflow downwind of the wind turbine, i.e. a rearward looking lidar may be mounted in or on the nacelle of a wind turbine. Preferably the lidar is a scanning lidar to scan the region of interest behind the turbine for instance to probe the region likely to be affected by shadowing. Alternatively multiple lidars, or a lidar with multiple look directions, may be used to look at fixed points in space relative to the nacelle in the downwind region.

The information collected by a downwind pointing Lidar system would as mentioned be useful for analysis of the performance of wind turbines which could be used in designing better turbines in the future. Understanding the wake from wind turbines would also be beneficial in understanding the siting of wind farms and the effects they have on the environment as well as improving the siting of individual turbines within a wind farm.

The invention claimed is:

1. A wind turbine having a lidar means for determining wind speed wherein the lidar means is mounted in the hub of the turbine and has at least one look direction inclined to the axis of rotation thereof such that as the hub rotates the lidar means scans the area in front of the turbine, said lidar means comprising a multiplexed lidar, said multiplexed lidar comprising:
   at least one laser source; and
   a plurality of sets of transmit/receive optics, each set of transmit/receive optics having a different look direction.

2. A wind turbine as claimed in claim 1 wherein at least one look direction is inclined at an angle within the range of 5°-20° of the axis of rotation.

3. A wind turbine as claimed in claim 2 wherein at least one look direction is inclined at an angle within the range of 10°-20° of the axis of rotation.

4. A wind turbine as claimed in claim 1 further comprising a control means, responsive to the output of the lidar means, for controlling the pitch of the rotor blades.

5. A wind turbine as claimed in claim 4 wherein the control means is adapted to feather the rotor blades when incoming wind gusts are detected.

6. A wind turbine as claimed in claim 4 wherein the control means is adapted to independently alter the pitch of each blade as it rotates.

7. A wind turbine as claimed in claim 6 wherein the control means is adapted to alter the pitch of each blade to maximise energy extraction.

8. A wind turbine as claimed in claim 6 wherein the control means is adapted to alter the pitch of each blade to provide load balancing.

9. A wind turbine having a lidar for determining wind speed wherein the lidar is mounted in the rotating hub of the turbine, said lidar comprising a multiplexed lidar comprising:
   at least one laser source; and
   a plurality of sets of transmit/receive optics, each set of transmit/receive optics having a different look direction wherein as the hub rotates the lidar scans the area in front of the turbine.

10. A wind turbine as claimed in claim 9 wherein said different look directions are accomplished simultaneously.

11. A wind turbine as claimed in claim 9 wherein there are three different look directions.

12. A wind turbine as claimed in claim 9 wherein at least one look direction is inclined at an angle within the range of 5°-20° of the axis of rotation.

13. A wind turbine as claimed in claim 12 wherein at least one look direction is inclined at an angle within the range of 10°-20° of the axis of rotation.

14. A wind turbine as claimed in claim 9 further comprising a control means, responsive to an output of the lidar, for controlling the pitch of the rotor blades.

15. A wind turbine as claimed in claim 14 wherein the control means is adapted to feather the rotor blades when incoming wind gusts are detected.

16. A wind turbine as claimed in claim 14 wherein the control means is adapted to independently alter the pitch of each blade as it rotates.

17. A wind turbine as claimed in claim 16 wherein the control means is adapted to alter the pitch of each blade to maximise energy extraction.

18. A wind turbine as claimed in claim 16 wherein the control means is adapted to alter the pitch of each blade to provide load balancing.

19. A wind turbine as claimed in claim 9 further comprising a controller, responsive to an output of the lidar, for controlling the pitch of the rotor blades.

20. A wind turbine as claimed in claim 19 wherein the controller is adapted to feather the rotor blades when incoming wind gusts are detected.

21. A wind turbine as claimed in claim 19 wherein the controller is adapted to independently alter the pitch of each blade as it rotates.

22. A wind turbine as claimed in claim 21 wherein the controller is adapted to alter the pitch of each blade to maximise energy extraction.

23. A wind turbine as claimed in claim 21 wherein the controller is adapted to alter the pitch of each blade to provide load balancing.

* * * * *